United States Patent Office 3,450,720
Patented June 17, 1969

3,450,720
3-DIFLUOROMETHYLENE STEROIDS
Eugene A. La Lancette, Lansdowne, Pa., assignor to E. I.
du Pont de Nemours and Company, Wilmington, Del.,
a corporation of Delaware
No Drawing. Filed Nov. 23, 1966, Ser. No. 596,463
Int. Cl. C07c *169/10, 169/22*
U.S. Cl. 260—397                  9 Claims

ABSTRACT OF THE DISCLOSURE

Described and claimed are 3-difluoromethylene steroids of the formula

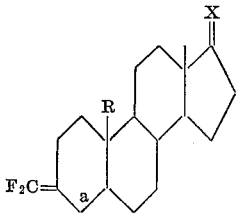

wherein R is methyl or hydrogen; X is O=,

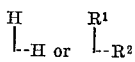

$R^1$ being hydroxy or O-lower alkanoyl containing up to 8 carbon atoms and $R^2$ being hydrogen, methyl, ethyl, vinyl or ethynyl where $R^1$ and $R^2$ are chosen such that when $R^1$ is hydroxy $R^2$ is not H and when $R^1$ is O-lower alkanoyl $R^2$ is H; and $a$ is a single or a double bond. The 3-difluoromethylene steroids of this invention possess a variety of useful androgenic activities.

FIELD OF THE INVENTION

This invention relates to novel fluorine-containing steroids. This invention is specifically directed to 3-difluoromethylene steroids, i.e., steroids having a difluoromethylene, $CF_2=$, substituent in the 3 position.

DESCRIPTION OF THE INVENTION

The new steroids of this invention have the formula

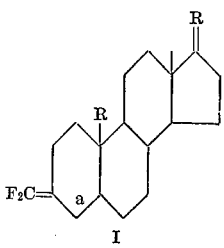

wherein R is methyl or hydrogen; X is O=,

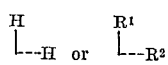

wherein $R^1$ is hydroxy or O-lower alkanoyl containing up to 8 carbon atoms and $R^2$ is hydrogen, methyl, ethyl, vinyl or ethynyl and $R^1$ and $R^2$ are chosen such that when $R^1$ is hydroxy $R^2$ is methyl, ethyl, vinyl or ethynyl and when $R^1$ is O-lower alkanoyl $R^2$ is H; and $a$, the bond between ring-carbon positions 4 and 5, is a single or a double bond. The lower alkanoyl radical in the above definition is the acyl radical of a lower alkanoic acid, for example formic, acetic, propionic, butyric, isobutyric, valeric, caproic, isocaproic or octanoic acid.

The novel steroids of this invention are prepared by reacting a 3-keto steroid of the formula

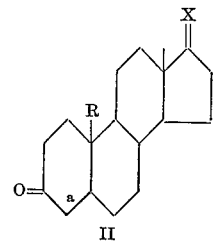

wherein R, X and $a$ are as defined above with at least equal molar amounts of tributylphosphine and sodium chlorodifluoroacetate at a temperature in the range of 150–200° C. An N,N-disubstituted amide is used as a reaction medium. The replacement of the oxygen of a keto group with a difluoromethylene group in nonsteroidal ketones using the above reaction has been described by Fuqua, Duncan and Silverstein, J. Org. Chem., 30, 2543 (1965).

The products of this invention can be prepared as described above when X in the starting material (II) is =O since the 17-keto group in steroids is much less reactive than the 3-keto group and the 17-keto group remains substantially unaffected in the above reaction.

Other 3-difluoromethylene steroids of this invention can also be obtained by chemical conversion of an initially obtained 3-difluoromethylene steroid. The conversion of the 17 substituent in this instance is done by the conventional transformations including reduction, oxidation, esterification, hydrolysis, alkylation, ethynylation, or vinylation using well-known procedures.

The reaction whereby a 3-keto steroid is converted to a 3-difluoromethylene steroid is best carried out by dissolving the keto steroid and tributylphosphine in the amide reaction medium, bringing the mixture to a temperature between 150 and 200° C., preferably between 160 and 190° C., and slowly adding a solution of sodium chlorodifluoroacetate in the amide medium to the hot mixture. This procedure is preferred since it generally prevents build-up of undecomposed sodium chlorodifluoroacetate, which might result in a violent exothermic decomposition. This possible hazard is avoided by using the above indicated reaction temperature, at which sodium chlorodifluoroacetate decomposes fairly rapidly, and by adding this reactant gradually to the reaction mixture.

Tributylphosphine and sodium chlorodifluoroacetate are both used in at least equimolar ratio relative to the keto steroid. Preferably, there is used from 1.0 to 1.5 moles of tributylphosphine and from 1.3 to 2.0 moles of sodium chlorodifluoroacetate per mole of keto steroid.

The reaction medium or solvent for this reaction is an N,N-disubstituted hydrocarbon amide which is liquid at the reaction temperature. Open chain aliphatic amides and cyclic amides in which the amido carbon and nitrogen are ring members (i.e., lactams) are suitable. Preferably, the amide reaction medium has a total of not more than 8 carbon atoms. Examples of such reaction media are the lower N,N-dialkylamides, e.g., N,N-dimethyl-, N,N-diethyl-, or N,N-dipropylformamide; N,N-dimethyl-, N,N-diethyl, or N,N-dipropylacetamide, N,N-dimethylpropionamide; the N-alkyllactams, e.g., N-methyl-, or N-methyl-α-pyrrolidone, N-methyl- or N-ethyl-α-piperidone, N-methylcaprolactam and the like. N-methyl-α-pyrrolidone is a preferred solvent. The quantity of amide solvent used is not critical and need only be sufficient to maintain good contact between the reactants.

The reaction is normally conducted at atmospheric pressure and under reflux if necessary, but it can also be conducted under pressure in suitably designed apparatus.

The product can be isolated by any desired suitable method. A convenient method consists of evaporating the reaction mixture to dryness and extracting the product with an appropriate organic solvent. The 3-difluoromethylene steroid can be purified by recrystallization and/or by chromatographic methods.

The following examples further illustrate the invention. Some of the products of this invention and their preparation either in one step by the above-described reaction or in a multistep operation involving the transformations of a 17 substituent into another substituent are described in these examples.

EMBODIMENTS OF THE INVENTION

Example 1.—3-difluoromethylene-5α-androstane-17-one

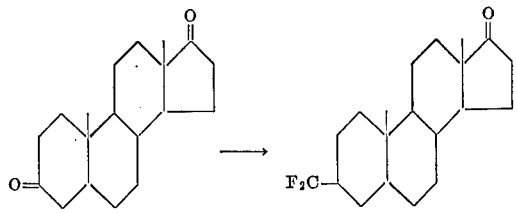

To a solution of 11.5 g. (39.8 mmoles) of 5α-androstane-3,17-dione, 8.14 g. (40 mmoles) of tributylphosphine and 6 ml. of N-methyl-2-pyrrolidone heated in an oil bath at 180° C. there was added over a period of 60 minutes a warm (50° C.) solution of 11.16 g. (73.2 mmoles) of sodium chloro-difluoroacetate in 34 ml. of N-methyl-2-pyrrolidone. The reaction mixture was taken to dryness in vacuo and the residue partitioned between ethyl acetate and water. The ethyl acetate solution was washed in turn with a saturated sodium bicarbonate solution, a saturated sodium chloride solution and dried over anhydrous magnesium sulfate. The filtered solution was taken to dryness in vacuo, the residue dissolved in a 1:1 benzene-hexane mixture and chromatographed on 450 g. of neutral alumina (grade III). Elution with the same solvent mixture yielded 5.88 g. (46% conversion) of 3-difluoromethylene-5α-androstane-17-one and then 2.83 g. of the starting material 5α-androstane-3,17-dione. Upon further elution with chloroform there was obtained 5.71 g. of a mixture containing additional starting material.

In a similar preparation, an analytical sample prepared by recrystallization of the chromatographed product from hexane had M.P. 110.5–112.5° C. and $[\alpha]_D^{23°} +79°$ (c. 1.16, CHCl$_3$).

Analysis.—Calcd. for $C_{20}C_{28}F_2O$: C, 74.50; H, 8.76; F, 11.78. Found: C, 74.49; H, 8.70; F, 11.64.

Ultraviolet: $\lambda_{max.}^{Hexane}$ 2970 A. ($\epsilon=33$)

Infrared.—5.70μ (C=CF$_2$) and 5.75μ (C=O).

The structure was also confirmed by the proton and F$^{19}$ nuclear magnetic resonance spectra.

This product can be reduced by the usual methods to 3-difluoromethylene-5α-androstane-17β-ol.

Example 2.—3-difluoromethylene-17β-acetoxy-5α-androstane

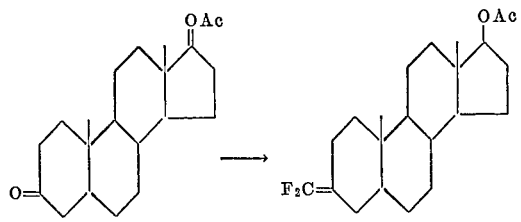

The addition of a solution of 11.16 g. (73.2 mmoles) of sodium chlorodifluoroacetate in 34 ml. of N-methyl-2-pyrrolidone to a solution of 13.35 g. (40 mmoles) of 17β-acetoxy-5α-androstane-3-one, 8.14 g. (40 mmoles) of tributylphosphine and 6 ml. of N-methyl-2-pyrrolidone carried out as described in Example 1 and followed by a similar isolation procedure gave a mixture which was dissolved in hexane and chromatographed on 500 g. of neutral alumina (grade III). Elution with hexane yielded 5.84 g. (40% conversion) of 3-difluoromethylene-17β-acetoxy-5α-androstane. Further elution with benzene gave 5.63 g. of 17β-acetoxy-5α-androstane-3-one.

An analytical sample of the product prepared by recrystallization from petroleum ether (B.P. 30–60° C.) had M.P. 124–126° C. and $[\alpha]_D^{23°}+4°$ (c. 1.33, CHCl$_3$).

Analysis.—Calcd. for $C_{22}H_{32}F_2O$: C, 72.10; H, 8.80. Found: C, 72.48; H, 8.79.

Infrared.—5.68μ (C=CF$_2$) and 5.78μ (—OCOCH$_3$).

The proton and F$^{19}$ N.M.R. spectra supported the assigned structure.

The same procedure applied to other 17β-acyloxy-5α-androstane-3-ones, for example, to 17β-isobutyroxy-, n-pentanoyloxy- or n-hexanoyloxy-5α-androstane-3-one, affords the corresponding 3-diffiuoromethylene--1β-acyloxy-5α-androstanes. All these esters can be hydrolyzed to 3-difluoromethylene-5α-androstane-17β-ol.

Example 3.—3-difluoromethylene-17β-acetoxy-5α-estrane

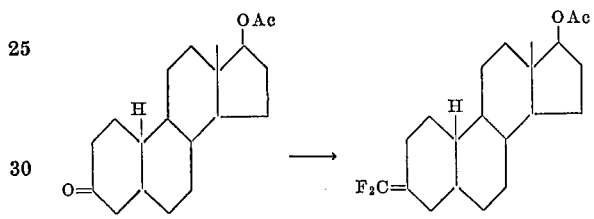

The addition of a solution of 10.2 g. (66.6 mmoles) of sodium chlorodifluoroacetate in 31 ml. of N-methyl-2-pyrrolidone to a solution of 11.62 g. (36.5 mmoles) of 17β-acetoxy-5α-estrane-3-one, 7.42 g. (36.6 mmoles) of tributylphosphine and 6 ml. of N-methyl-2-pyrrolidone carried out as described in Example 1 gave a mixture which was dissolved in hexane and chromatographed on 500 g. of neutral alumina (grade III). Elution with hexane yielded 6.30 g. (49% conversion) of 3-difluoromethylene-17β-acetoxy-5α-estrane. Further elution with benzene gave 5.51 g. of unreacted 17β-acetoxy-5α-estrane-3-one.

An analytical sample of the product prepared by re-chromatographing on 500 g. of alumina and recrystallization from petroleum ether (B.P. 30–60° C.) had M.P. 55–57° C. and $[\alpha]_D^{23°} +18°$ (c. 1.37, CHCl$_3$).

Analysis.—Calcd. for $C_{21}H_{30}F_2O_2$: C, 71.55; H, 8.58; F, 10.78. Found: C, 72.00; H, 8.47; F, 10.77.

Infrared.—5.68μ (C=CF$_2$) and 5.74μ (—OCOCH$_3$).

The proton and F$^{19}$ N.M.R. spectra were consistent with the assigned structure.

In a similar manner, treatment of 17β-propionoxy-, butyroxy-, or isocaproyloxy-5α-estrane-3-one in accordance with the described procedure yields the corresponding 3 - difluoromethylene - 17β - acyloxy-5α-estranes. All these esters are hydrolyzable to 3-difluoromethylene-5α-estrane-17β-ol.

Example 4.—3-difluoromethylene-5α-estrane-17-one

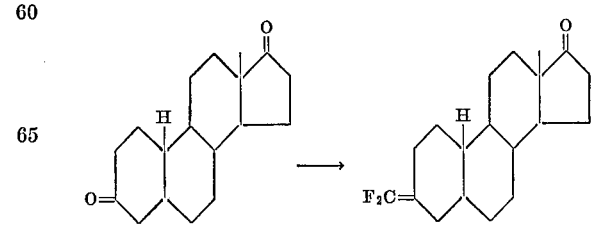

The addition of a solution of 14.5 g. (95.2 mmoles) of sodium chlorodifluoroacetate in 45 ml. of N-methyl-2-pyrrolidone to a solution of 14.286 g. (52 mmoles) of 5α-estrane-3,17-dione, 10.6 g. (52 mmoles) of tributylphosphine and 8 ml. of N-methyl-2-pyrrolidone carried out as described in Example 1 gave a mixture which was dissolved in hexane and chromatographed on 650 g. of neutral alumina (grade III). Elution with hexane yielded 5.59 g. (35% conversion) of 3-difluoromethylene-5α-estrane-17-one. Further elution with hexane and then with benzene gave 7.17 g. of unchanged 5α-estrane-3,17-dione.

In a similar run an analytical sample prepared by recrystallization of the chromatographed products from petroleum ether (B.P. 30–60° C.) had M.P. 125–126° C. and $[\alpha]_D^{23} + 96°$ (c. 1.40, CHCl$_3$).

Analysis.—Calcd. for $C_{19}H_{26}F_2O$: C, 73.99; H, 8.50; F, 12.32. Found: C, 74.38; H, 8.51; F, 12.33.

Infrared.—5.68μ (C=CF$_2$) and 5.75μ (C=O).

The proton and $F^{19}$ N.M.R. spectra were consistent with the structure.

Example 5.—3-difluoromethylene-17α-methyl-17β-hydroxy-5α-androstane

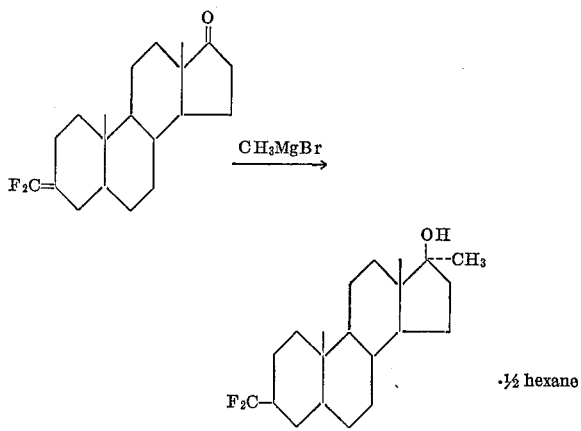

To a solution of 8.26 g. (25.6 mmoles) of 3-difluoromethylene-5α-androstane-17-one in 200 ml. of anhydrous ether there was added over a period of 15 minutes 27 ml. (81 mmoles) of a 3 N solution of methylmagnesium bromide in ether. The reaction mixture was stirred at ambient temperature for 24 hours, and then treated with 250 ml. of a saturated aqueous ammonium chloride solution. After allowing the mixture to stir for 30 minutes the product was extracted with ethyl acetate, the extract washed with water and dried over anhydrous calcium sulfate. The filtered solution was taken to dryness to give 8.70 g. (100%) of crude 3-difluoromethylene-17α-methyl-17β-hydroxy-5α-androstane.

An analytical sample prepared by recrystallization from hexane was obtained as a solvate (1 molecule of hexane per 2 molecules of steroid) and had M.P. 154–155° C. and $[\alpha]_D^{23°} -11°$ (c. 1.59, CHCl$_3$).

Analysis.—Calcd. for $C_{21}H_{32}F_2O \cdot \frac{1}{2}C_6H_{14}$: C, 75.54; H, 10.30; F, 9.96. Found: C, 75.66; H, 10.02; F, 9.95.

Infrared: 3.0μ (OH) and 5.68μ (C=CF$_2$).

The proton and $F^{19}$ N.M.R. spectra confirmed the structure.

3-difluoromethylene-17α-ethyl-17β-hydroxy-5α-androstane can be prepared in a similar manner, using ethylmagnesium bromide. Likewise, 3-difluoromethylene-17α-methyl (and ethyl)-17β-hydroxy-5α-estrane are obtainable by the same procedure, starting with 3-difluoromethylene-5α-estrane-17-one. These 17β-hydroxy steroids can be acylated, for example, converted to the 17β-acetates or n-hexanoates.

Example 6.—3-difluoromethylene-17α-ethynyl-17β-hydroxy-5α-androstane

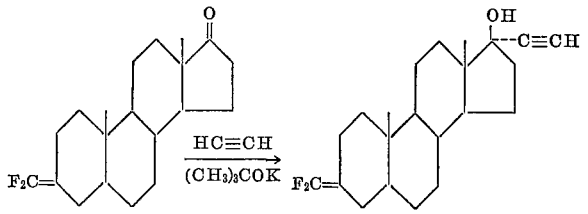

To a potassium t-butoxide solution in t-butyl alcohol (280 ml.) prepared from 5.55 g. (0.14 g. atom) of potassium there was added 5.55 g. (17.2 mmoles) of 3-difluoromethylene-5α-androstane-17-one. Actylene was passed through this solution for 18 hours and a solution of 6 g. of ammonium chloride in 300 ml. of water was then added. After allowing the reaction mixture to stir for 1 hour, it was acidified with concentrated hydrochloric acid and poured into water. The white solid precipitate was collected by filtration and washed with water to give 5.02 g. (84%) of crude 3-difluoromethylene-17α-ethynyl-17β-hydroxy-5α-androstane.

An analytical sample prepared by chromatography on neutral alumina (grade III) and crystallization from hexane had M.P. 132–134° C. and $[\alpha]_D^{24} -31°$ (c. 1.18, CHCl$_3$).

Analysis.—Calcd. for $C_{22}H_{30}F_2O$: C, 75.82; H, 8.68. Found: C, 76.40; H, 8.85.

Infrared.—2.984μ (OH), 3.04μ (—C≡CH) and 5.68μ (C=CF$_2$).

The structure was confirmed by the proton and $F^{19}$ N.M.R. spectra.

3-difluoromethylene-17α-ethynyl-17β-hydroxy-5α-estrane is obtainable in the same manner, starting with 3-difluoromethylene-5α-estrane-17-one. Both steroids can be converted to 3-difluoromethylene-17α-vinyl-17β-hydroxy-5α-androstane or 5α-estrane by catalytic reduction of the ethynyl group, for example, in the presence of a palladium-on-strontium carbonate catalyst, or these products can be obtained by reaction of vinylmagnesium bromide with the 3-difluoromethylene-17-keto-steroids. The 17β-hydroxy group of these various compounds can be acylated by the usual procedures, for example, converted to the 17β-acetoxy- or -butyroxy group.

Example 7.—3-difluoromethylene-5α-androstane

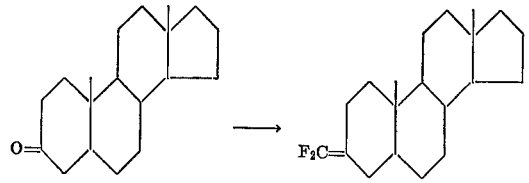

The addition of a solution of 5.58 g. (36.6 mmoles) of sodium chlorodifluoroacetate in 17 ml. of N-methyl-2-pyrrolidone to a solution of 4.483 g. (16.3 mmoles) of 5α-androstane-3-one, 4.07 g. (20 mmoles) of tributylphosphine and 3 ml. of N-methyl-2-pyrrolidone carried out as described in Example 1 gave a mixture which was dissolved in hexane and chromatographed on 300 g. of a magnesium silicate chromatographic absorbent.

An analytical sample prepared by recrystallization of the chromatographed product from methanol had M.P. 62.5–65° C. and $[\alpha]_D^{24} -2°$ (c. 0.88, CHCl$_3$).

Analysis.—Calcd. for $C_{20}H_{30}F_2$: C, 77.87; H, 9.81; F, 12.32. Found: C, 78.11; H, 10.03; F, 11.78.

Infrared.—5.68μ (C=CF$_2$).

The proton and $F^{19}$ N.M.R. spectra confirmed the assigned structure.

Example 8.—3-difluoromethylene-4-estrene-17-one

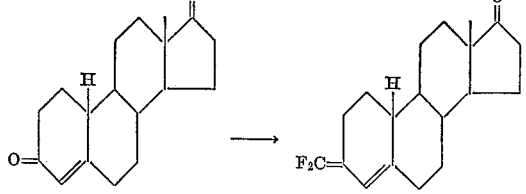

The addition of a solution of 11.35 g. (74.4 mmoles) of sodium chlorodifluoroacetate in 34 ml. of N-methyl-2-pyrrolidone to a solution of 9.32 g. (34.2 mmoles) of 4-estrene-3,17-dione, 7.6 g. (37.5 mmoles) of tributylphosphine and 5 ml. of N-methyl-2-pyrrolidone carried out as described in Example 1 gave a mixture which was chromatographed on 1100 g. of neutral alumina (grade III). Elution with hexane, with 1:2 benzene-hexane and then with benzene gave a mixture (1.31 g.) exhibiting a 5.68μ band in the infrared spectrum. This mixture was rechromatographed at some loss on 200 g. of neutral alumina (grade III) to give 0.277 g. of 3-difluoromethylene-4-estrene-17-one which, after recrystallization from petroleum ether (B.P. 30–60° C.), melted at 152–162° C.

Infrared.—5.68μ (C=CF$_2$) and 5.74μ (C=O).

Ultraviolet: $\lambda_{max.}^{isooctane}$ 244 mμ and 283 mμ

Mass spectrum.—Parent ion at 306 (calcd. for $C_{19}H_{24}F_2O$ 306.4).

3-difluoromethylene-4-androstene-17-one is obtainable in the same manner, starting from 4-androstane-3,17-dione. Both of these 17-keto steroids can be reduced to the corresponding 3-difluoromethylene-17β-ols by known methods. They can also be converted to the corresponding 3-difluoromethylene-17β-hydroxy-17α-methyl, ethyl, vinyl or ethynyl-4-estrenes or 4-androstenes by the methods of Examples 5 or 6.

The 3-difluoromethylene steroids of this invention display a marked influence on androgenic activity, which can be largely controlled by varying the nature of the C-17 substituent. Thus, in some cases, for example with 3-difluoromethylene - 17α-methyl-17β-hydroxy-5α-androstane, androgenic activity is present, as shown by tests on castrate male rats. Other compounds are antiandrogenic, such as 3-difluoromethylene-5α-androstane-17-one, which inhibits endogenous androgen in the intact male rat and 3-difluoromethylene-17β-acetoxy-5α-androstane, which inhibits the testosterone-induced hypertrophy of the comb in the cockerel. Yet in other cases, for example with 3-difluoromethylene-5α-estrane-17-one, more general antiandrogenic activity is observed in both species. The latter compound is able to inhibit the testosterone-induced hypertrophy of the ventral prostate in the castrate rat, and also suppresses the testosterone-induced hypertrophy of the comb in the cockerel. In contrast, 3-difluoromethylene-17β-acetoxy-5α-estrane is not markedly antiandrogenic but possesses anabolic activity. Progestational activity is possessed by some compounds of the invention, such as those having a 17α-ethynyl-17β-hydroxy group.

As is known, antiandrogenic steroids are valuable agents in the therapeutic treatment of prostatic carcinoma [see, for example, the article by Huggins in Cancer Research 16, 825 (1956)] and have been proposed in the treatment of other disorders such as post-puberal and idiopathic hirsutism in women, the Stein-Leventhal syndrome, and adolescent and premenstrual acne [see, for example, Saunders at al., Steroids 3, 687 (1964), listing leading references]. The various other biological properties of the compounds of the invention have long been known to be therapeutically useful.

The foregong detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows:

1. A compound of the formula

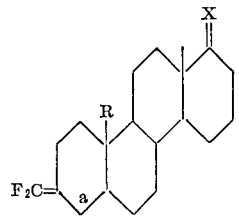

wherein
R is methyl or hydrogen;
X is O=,

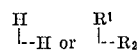

$R^1$ being hydroxy or O-lower alkanoyl containing up to 8 carbon atoms and $R^2$ being hydrogen, methyl, ethyl, vinyl or ethynyl where $R^1$ and $R^2$ are chosen such that when $R^1$ is hydroxy $R^2$ is methyl, ethyl, vinyl or ethynyl and when $R^1$ is O-lower alkanoyl $R^2$ is H; and a, the bond between ring-carbon positions 4 and 5, is a single or a double bond.

2. The compound of claim 1 wherein R is methyl, X is =O, and a is a single bond, said compound being 3-difluoromethylene-5α-androstane-17-one.

3. The compound of claim 1 wherein R is methyl, X is $R^1$ and $R^2$ wherein $R^1$ is acetoxy, $R^2$ is hydrogen and a is a single bond, said compound being 3-difluoromethylene-17β-acetoxy-5α-androstane.

4. The compound of claim 1 wherein R is hydrogen, X is $R^1$ and $R^2$ wherein $R^1$ is acetoxy and $R^2$ is hydrogen and a is a single bond, said compound being 3-difluoromethylene -17β-acetoxy-5α-estrane.

5. The compound of claim 1 wherein R is hydrogen, X is =O, a is a single bond, said compound being 3-difluoromethylene-5α-estrane-17-one.

6. The compound of claim 1 wherein R is methyl, X is $R^1$ and $R^2$, wherein $R^1$ is hydroxy and $R^2$ is ethynyl and a is a single bond, said compound being 3-difluoromethylene -17α-ethynyl-17β-hydroxy-5α-androstane.

7. The compound of claim 1 wherein R is methyl, X is

and a is a single bond, said compound being 3-difluoromethylene-5α-androstane.

8. The compound of claim 1 wherein R is hydrogen, X is =O and a is a double bond, said compound being 3-difluoromethylene-4-estrene-17-one.

9. The compound of claim 1 wherein R is methyl, X is $R^1$ and $R^2$, wherein $R^1$ is hydroxy and $R^2$ is methyl and a is a single bond, said compound being 3-difluoromethylene-17α-methyl-17β-hydroxy-5α-androstane.

No references cited.

ELBERT L. ROBERTS, Primary Examiner.

U.S. Cl. X.R.

260—397.3, 397.5